(12) United States Patent
Kwon

(10) Patent No.: US 11,557,157 B2
(45) Date of Patent: Jan. 17, 2023

(54) SYSTEM AND METHOD FOR INSPECTING VEHICLE PULL

(71) Applicants: HYUNDAI MOTOR COMPANY, Seoul (KR); KIA MOTORS CORPORATION, Seoul (KR)

(72) Inventor: Young Taek Kwon, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 335 days.

(21) Appl. No.: 16/884,682

(22) Filed: May 27, 2020

(65) Prior Publication Data
US 2021/0183176 A1 Jun. 17, 2021

(30) Foreign Application Priority Data
Dec. 13, 2019 (KR) .......................... 10-2019-0166311

(51) Int. Cl.
*G07C 5/02* (2006.01)
*G01M 17/06* (2006.01)
*G07C 5/00* (2006.01)
*G07C 5/08* (2006.01)

(52) U.S. Cl.
CPC ............... *G07C 5/02* (2013.01); *G01M 17/06* (2013.01); *G07C 5/008* (2013.01); *G07C 5/0808* (2013.01); *G06F 2213/3814* (2013.01)

(58) Field of Classification Search
CPC ........ G07C 5/02; G07C 5/008; G07C 5/0808; G01M 17/06; G06F 2213/3814; B60W 40/105; B60W 2520/10; B60W 2520/28; B60W 2540/18; G08G 1/052; B60Y 2400/30
See application file for complete search history.

(56) References Cited

U.S. PATENT DOCUMENTS

| | | | | |
|---|---|---|---|---|
| 4,795,998 A | * | 1/1989 | Dunbar | ..................... G01L 9/02 338/208 |
| 2014/0222324 A1 | * | 8/2014 | Muetzel | ........... G08G 1/096716 701/119 |
| 2019/0168763 A1 | * | 6/2019 | Jung | ..................... B62D 7/1581 |
| 2019/0322284 A1 | * | 10/2019 | Yang | ................... G01M 17/007 |

FOREIGN PATENT DOCUMENTS

KR 10-2019-0123431 11/2019

* cited by examiner

*Primary Examiner* — Sizo B Vilakazi
(74) *Attorney, Agent, or Firm* — Lempia Summerfield Katz LLC

(57) ABSTRACT

A system for inspecting vehicle pull of a vehicle includes: a sensor monitoring device that collects information for vehicle pull inspection from a sensor installed in the vehicle; a travel path measurement device that measures a travel path of the vehicle in a vehicle pull measurement section; and a vehicle pull analysis device that determines whether the vehicle passes the vehicle pull inspection, based on the sensing information collected from the sensor monitoring device and travel path measurement information collected from the travel path measurement device.

18 Claims, 7 Drawing Sheets

SYSTEM AND METHOD FOR INSPECTING VEHICLE PULL

CROSS-REFERENCE TO RELATED APPLICATION

This application claims priority to and the benefit of Korean Patent Application No. 10-2019-0166311, filed on Dec. 13, 2019, the entire contents of which are incorporated herein by reference.

FIELD

The present disclosure relates to a vehicle inspection system, and more particularly, relates to a technology for more accurately inspecting vehicle pull.

BACKGROUND

The statements in this section merely provide background information related to the present disclosure and may not constitute prior art.

After vehicle assembly is completed in a vehicle manufacturer, a side-slip test and a vehicle high-speed driving test using a roll and brake apparatus are performed after wheel alignment in a vehicle inspection line process.

Further, comprehensive inspections of power performance, driving performance, braking performance, steering performance, and vehicle pull are finally performed through an actual driving test.

In general, a vehicle pull phenomenon refers to a phenomenon in which a vehicle pulls to one side irrespective of the driver's intention when the driver takes the hands off the steering wheel while the vehicle travels straight ahead. For example, the vehicle pull phenomenon refers to a phenomenon in which the vehicle pulls to the left or right without continuing to travel straight ahead when the driver takes the hands off the steering wheel while driving straight ahead on a highway, and unlike cornering or turning characteristics of the vehicle, the vehicle pull phenomenon is only confined to driving straight ahead.

The vehicle pull phenomenon is directly related to the driver's safety and causes the driver's fatigue because when the vehicle pulls to one side the driver has to operate the steering wheel in the opposite direction to drive straight ahead.

Most vehicle manufacturers perform vehicle pull inspections on completed vehicles. Furthermore, the vehicle pull phenomenon is one of the important consumer evaluation items in the US market. However, the vehicle pull phenomenon is not a phenomenon confined to only a vehicle or a tire and is a vehicle characteristic complexly affected by various factors. In practice, the vehicle pull phenomenon may be caused by a problem inside a vehicle or tire wear.

In existing vehicle pull inspection, due to a tester's driving habit and emotional evaluation and an error in the operation of a steering wheel by the tester, it is difficult to accurately determine whether a vehicle pulls to one side. Due to this, a quality test is not accurately performed on the vehicle, which causes consumer complaints.

Accordingly, in the related art, a vehicle pull inspection system using laser sensors installed around a test road is disclosed, but we have discovered that an error in the operation of a steering wheel by a tester is not considered at all.

Furthermore, a conventional vehicle pull inspection system using a differential global position system (D-GPS) is capable of measuring displacement on a straight travel path for vehicle pull inspection. However, we have found that the conventional vehicle pull inspection system may not be applied as an inspection method in an actual factory because separate handling (an additional step) by a tester is required and an expensive GPS receiving terminal is used.

SUMMARY

An aspect of the present disclosure provides a system and method for inspecting vehicle pull.

Another aspect of the present disclosure provides a vehicle pull inspection system and method for more accurately inspecting a vehicle pull phenomenon of a target vehicle using a travel path measurement device buried under a test road for vehicle pull inspection and a sensor monitoring device installed in the vehicle.

Another aspect of the present disclosure provides a vehicle pull inspection system and method for more accurately inspecting a vehicle pull phenomenon of a target vehicle using a laser sensor installed on one side of a test road and a sensor monitoring device installed in the vehicle.

Another aspect of the present disclosure provides a vehicle pull inspection system and method for achieving excellent data consistency, reducing or minimizing driver intervention and additional steps, and facilitating maintenance and management.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for inspecting vehicle pull includes: a sensor monitoring device that collects sensing information desired for vehicle pull inspection from a sensor installed in a vehicle, a travel path measurement device that measures a travel path of the vehicle in a vehicle pull measurement section, and a vehicle pull analysis device that determines whether the vehicle passes the vehicle pull inspection, based on the sensing information collected from the sensor monitoring device and travel path measurement information collected from the travel path measurement device.

In one form of the present disclosure, the sensor may include a vehicle speed sensor that generates tire wheel speed sensing information desired to measure a travel speed of the vehicle and an angular velocity sensor that generates rotation angle sensing information of a steering wheel that is desired to determine whether the steering wheel is artificially operated.

In another form of the present disclosure, the travel path measurement device may include a first path measurement module buried under a road at a start point of the vehicle pull measurement section and a second path measurement module buried under the road at an end point of the vehicle pull measurement section.

In some forms of the present disclosure, each of the first and second path measurement modules may include a plurality of pressure sensing elements, and pressure sensing elements of the plurality of pressure sensing elements may output pressure sensing signals by being activated when pressures applied by left and right tires of the vehicle are higher than or equal to a reference value.

In some forms of the present disclosure, the travel path measurement device may generate the travel path measurement information in the vehicle pull measurement section, based on the pressure sensing signals from the pressure sensing elements of the first and second path measurement modules.

In some forms of the present disclosure, the travel path measurement information may include information regarding approach location variations and approach direction variations of the left and right tires of the vehicle.

In some foams of the present disclosure, the vehicle pull analysis device may determine that the vehicle passes the vehicle pull inspection, when the approach location variations satisfy a first reference range and the approach direction variations satisfy a second reference range in a case where the travel speed of the vehicle in the vehicle pull measurement section is maintained at a pre-defined regulation speed and the steering wheel is not artificially operated.

In some foams of the present disclosure, the sensor monitoring device may be connected to an on-board diagnostics terminal installed in the vehicle.

In some foils of the present disclosure, the sensor monitoring device may include a wireless communication module and may transmit the collected sensing information to the vehicle pull analysis device via wireless communication.

In some forms of the present disclosure, the wireless communication may include at least one of Wi-Fi communication, 4G long term evolution (LTE) communication, and/or 5G new radio (NR) communication.

According to another aspect of the present disclosure, a method for inspecting vehicle pull in a vehicle pull inspection system may include: detecting, a vehicle pull inspection system, whether a target vehicle enters a vehicle pull measurement section; collecting, by a sensor monitoring device, sensing information from a sensor installed in the target vehicle, when it is detected that the vehicle enters the vehicle pull measurement section; measuring, by a travel path measurement device, travel paths for left/right tires of the target vehicle at a start point and an endpoint of the vehicle pull measurement section, when it is detected that the vehicle enters the vehicle pull measurement section, and determining whether the target vehicle passes a vehicle pull inspection, based on the collected sensing information and the measured travel path, when it is detected that the vehicle leaves the vehicle pull measurement section.

In some forms of the present disclosure, the sensor may include a vehicle speed sensor that generates tire wheel speed sensing information to measure a travel speed of the target vehicle and an angular velocity sensor that generates rotation angle sensing information of a steering wheel that is desired to determine whether the steering wheel included in the target vehicle is artificially operated.

In some foams of the present disclosure, the vehicle pull inspection system may include a travel path measurement device that measures the travel path, and the travel path measurement device may include a first path measurement module and a second path measurement module that are buried under a road at the start point and the end point of the vehicle pull measurement section.

In some forms of the present disclosure, each of the first and second path measurement modules may include a plurality of pressure sensing elements, and the pressure sensing elements may output pressure sensing signals when pressures applied by the left and right tires of the target vehicle are higher than or equal to a reference value.

In some forms of the present disclosure, the travel path measurement device may measure the travel path in the vehicle pull measurement section, based on the pressure sensing signals.

In some forms of the present disclosure, the measured travel path may include information regarding approach location variations and approach direction variations of the left/right tires of the target vehicle.

In some foams of the present disclosure, the vehicle pull inspection system may include a vehicle pull analysis device that determines whether the target vehicle passes the vehicle pull inspection, and the vehicle pull analysis device may determine that the target vehicle passes the vehicle pull inspection, when the approach location variations satisfy a first reference range and the approach direction variations satisfy a second reference range in a case where the travel speed of the target vehicle in the vehicle pull measurement section is maintained at a pre-defined regulation speed and the steering wheel is not artificially operated.

In some foams of the present disclosure, the vehicle pull inspection system may include a sensor monitoring device that collects the sensing information from the sensor, and the sensor monitoring device may be connected to an on-board diagnostics terminal installed in the target vehicle and may collect the sensing information.

In some foils of the present disclosure, the sensor monitoring device may include a wireless communication module and may transmit the collected sensing information to the vehicle pull analysis device via wireless communication.

In some forms of the present disclosure, the wireless communication may include at least one of Wi-Fi communication, 4G long term evolution (LTE) communication, or 5G new radio (NR) communication.

The technical problems to be solved by the present disclosure are not limited to the aforementioned problems, and any other technical problems not mentioned herein will be clearly understood from the following description by those skilled in the art to which the present disclosure pertains.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
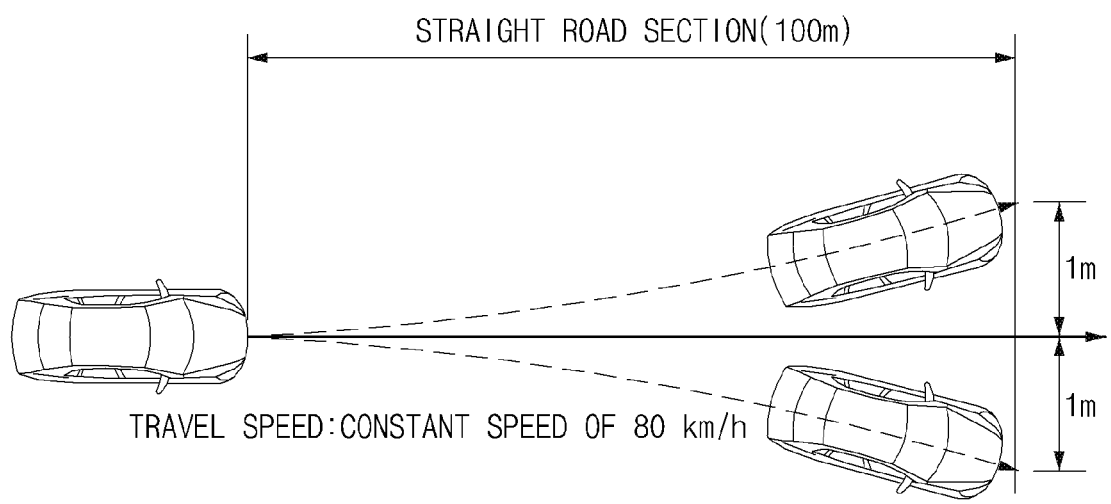
FIG. 1 is a view illustrating an evaluation criterion for existing vehicle pull inspection.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary forms of the present disclosure will be described in detail with reference to FIGS. 1 to 7.

FIG. 1 is a view illustrating an evaluation criterion for existing vehicle pull inspection.

Referring to FIG. 1, a corresponding vehicle may pass the vehicle pull inspection only in the case where the vehicle does not deviate from a straight-line course to the left or right by more than 1 meter when the vehicle travels 100 meters at a constant speed of 80 KPH in a state in which a tester does not hold a steering wheel during a vehicle road test.

Figure 2:
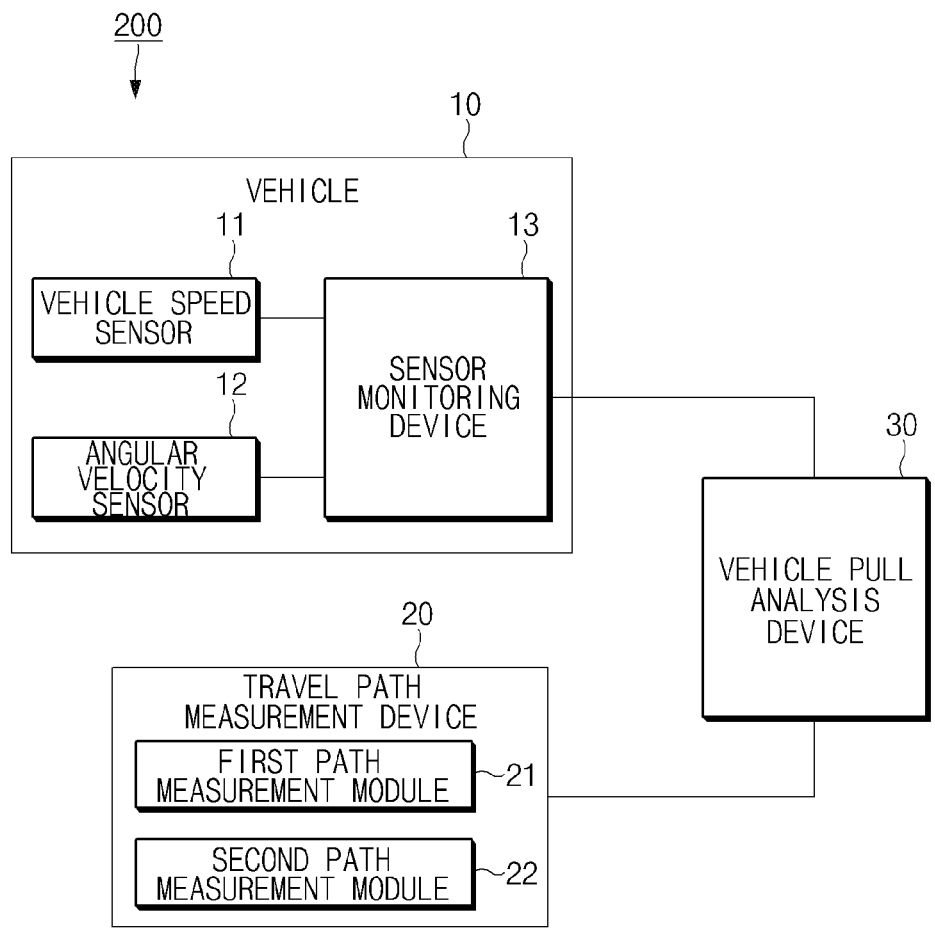
FIG. 2 is a block diagram illustrating a configuration of a vehicle pull inspection system according to one form of the present disclosure.

FIG. 2 is a block diagram illustrating a configuration of a vehicle pull inspection system according to one form of the present disclosure.

Referring to FIG. 2, the vehicle pull inspection system 200 may include a vehicle 10, a travel path measurement device 20, and a vehicle pull analysis device 30.

The vehicle 10 may include a vehicle speed sensor 11 that measures the current travel speed by measuring wheel speed, an angular velocity sensor 12 that measures the rotation angle of a steering wheel, and a sensor monitoring device 13 that collects information sensed by the vehicle speed sensor 11 and the angular velocity sensor 12 during travel of the vehicle 10.

The sensor monitoring device 13 may be connected to an on-board diagnostics (BOD) terminal (e.g., an OBD II terminal) that is installed in the vehicle 10, and may collect various pieces of sensing information from electronic control devices in the vehicle 10.

The vehicle speed sensor 11 and the angular velocity sensor 12 may exchange information with the sensor monitoring device 13 through in-vehicle communication. For example, the in-vehicle communication may be, but is not limited to, controller area network (CAN) communication.

The sensor monitoring device 13 may transmit the collected sensing information (e.g., the information regarding the current travel speed and the information regarding the rotation angle of the steering wheel) to the vehicle pull analysis device 30.

In one form, the sensor monitoring device 13 may transmit unique identification information of the vehicle 10 (e.g., the vehicle identification number (VIN)) and the collected sensing information to the vehicle pull analysis device 30 via a wireless communication module (e.g., a wireless communication modem).

Here, the wireless communication module may include a short-range wireless communication module (e.g., a Wi-Fi communication module), a mobile communication module (e.g., 4G long term evolution (LTE) communication module), a 5G new radio (NR) communication module, or the like.

The travel path measurement device 20 may be buried in a specific position on a straight travel path for vehicle pull inspection.

The travel path measurement device 20 may include a first path measurement module 21 buried at an inspection start point on the straight travel path and a second path measurement module 22 buried at an inspection end point on the straight travel path.

Each of the first path measurement module 21 and the second path measurement module 22 may include a plurality of pressure sensing elements and may measure approach locations and approach directions (or angles) of tires (e.g., left/right front tires) of the vehicle 10 that is travelling. Here, the pressure sensing elements may output pressure sensing signals by being activated when a predetermined pressure or more is applied thereto.

In another form, the travel path measurement device 20 may transmit, to the vehicle pull analysis device 30, the information regarding the approach locations and the approach directions of the left/right front tires of the vehicle 10 that are measured by the first path measurement module 21 and the second path measurement module 22. The vehicle pull analysis device 30 may detect variations in the approach locations and the approach directions of the left/right front tires of the vehicle 10 in a vehicle pull measurement section, based on the received information regarding the approach locations and the approach directions.

In another form, the travel path measurement device 20 may detect variations in the approach locations and the approach directions of the left/right front tires of the vehicle 10 in the vehicle pull measurement section, based on the pressure sensing signals output by the pressure sensing elements and may transmit the detection results to the vehicle pull analysis device 30.

The travel path measurement device 20 may exchange information with the vehicle pull analysis device 30 via wired communication. However, this is only one form, and the travel path measurement device 20 according to another form may exchange information with the vehicle pull analysis device 30 via certain wireless communication.

The vehicle pull analysis device 30 may analyze a vehicle pull state of the vehicle 10 that is travelling, based on the information received from the sensor monitoring device 13 and the travel path measurement device 20.

The vehicle pull analysis device 30 may determine whether a vehicle pull phenomenon occurs or not, by determining whether the travel displacement of the corresponding vehicle 10 in the vehicle pull measurement section is within a certain allowable error range (e.g., 1 meter (m)), based on the information received from the travel path measurement device 20.

Furthermore, based on the sensing information received from the sensor monitoring device 13, the vehicle pull analysis device 30 may not only determine whether the travel speed of the vehicle 10 is maintained at the regulation speed in the straight travel section (e.g., the vehicle pull measurement section) for the vehicle pull inspection, but may also determine whether the rotation angle of the steering wheel of the vehicle 10 is within a certain allowable error range (or a reference range). That is, the vehicle pull analysis device 30 may determine whether the vehicle pull phenomenon determined based on the information received from the travel path measurement device 20 is valid or not, by using the sensing information received from the sensor monitoring device 13.

The vehicle pull analysis device 30 may finally determine whether the corresponding vehicle 10 passes the vehicle pull inspection, based on the determination results.

Figure 3:
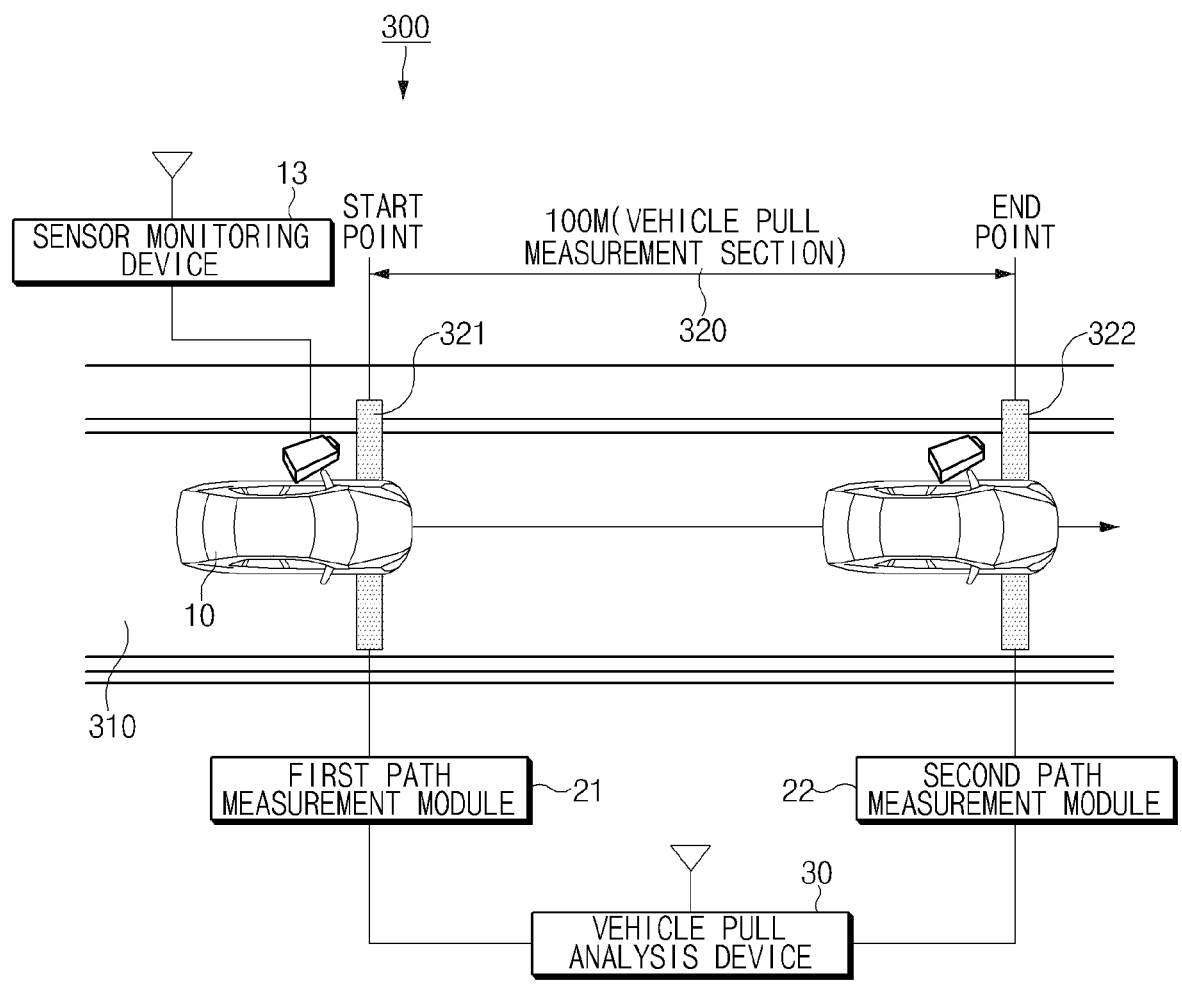
FIG. 3 is a view illustrating a vehicle pull determination procedure in the vehicle pull inspection system according to one form of the present disclosure.

FIG. 3 is a view illustrating a vehicle pull determination procedure in the vehicle pull inspection system according to one form of the present disclosure.

Referring to FIG. 3, a partial straight road section of a test road 310 may be used as a vehicle pull measurement section 320. For example, the vehicle pull measurement section 320 may be, but is not limited to, a 100-M straight road section.

At a start point 321 of the vehicle pull measurement section 320, the first path measurement module 21 may be buried under the road surface.

At an end point 322 of the vehicle pull measurement section 320, the second path measurement module 22 may be buried under the road surface.

The first path measurement module 21 may include a plurality of pressure sensing elements arranged at predetermined intervals on a predetermined area and may detect pressures applied by tires of the vehicle 10. The first path measurement module 21 may measure approach locations and approach directions (that is, approach angles) of the left/right front tires of the vehicle 10 at the start point 321, based on the detected pressures.

The second path measurement module 22 may also include a plurality of pressure sensing elements arranged at predetermined intervals on a predetermined area and may detect pressures applied by the tires of the vehicle 10. The second path measurement module 22 may measure approach locations and approach directions of the left/right front tires of the vehicle 10 at the end point 322.

For example, in the case where the pressures applied to the pressure sensing elements satisfy a certain criterion (e.g., 300 Kg or more), the first path measurement module 21 and the second path measurement module 22 may determine that the tires of the vehicle 10 pass over the corresponding pressure sensing elements.

Hereinafter, for convenience of description, the approach locations and the approach directions measured by the first path measurement module 21 are referred to as the start-point approach locations and the start-point approach directions, and the approach locations and the approach directions measured by the second path measurement module 22 are referred to as the end-point approach locations and the end-point approach directions.

The vehicle pull analysis device 30 may calculate variations in the approach locations (that is, displacements) of the tires of the vehicle 10 and variations in the approach angles thereof in the vehicle pull measurement section 320, based on the start-point approach locations and the start-point approach directions measured by the first path measurement module 21 and the end-point approach locations and the end-point approach directions measured by the second path measurement module 22.

The vehicle pull analysis device 30 may determine whether the vehicle 10 pulls to one side, based on the calculated approach location variations and the calculated approach angle variations.

The sensor monitoring device 13 may collect information from various types of sensors installed in the vehicle 10 and may provide the collected information to the vehicle pull analysis device 30 via wireless communication.

Here, the sensors may include, but are not limited to, the vehicle speed sensor 11 that senses the current travel speed by measuring the rotational speeds of tire wheels of the vehicle 10 and the angular velocity sensor 12 that senses the rotation angle of the steering wheel of the vehicle 10.

The vehicle pull analysis device 30 may determine whether the vehicle 10 travels at the regulation speed in the vehicle pull measurement section 320, based on the information regarding the current travel speed (or the information regarding the rotational speeds of the tire wheels) that is received from the sensor monitoring device 13. For example, the regulation speed may be, but is not limited to, 80±5 KPH.

The vehicle pull analysis device 30 may determine whether the steering wheel is operated by a driver of the vehicle 10 or external pressure, based on the information regarding the rotation angle of the steering wheel that is received from the sensor monitoring device 13.

In the case where it is determined that the regulation speed is maintained in the vehicle pull measurement section 320 and there is no operation of the steering wheel, the vehicle pull analysis device 30 may finally determine whether the vehicle 10 passes the vehicle pull inspection, based on the approach location variations and the approach angle variations.

Figure 4:
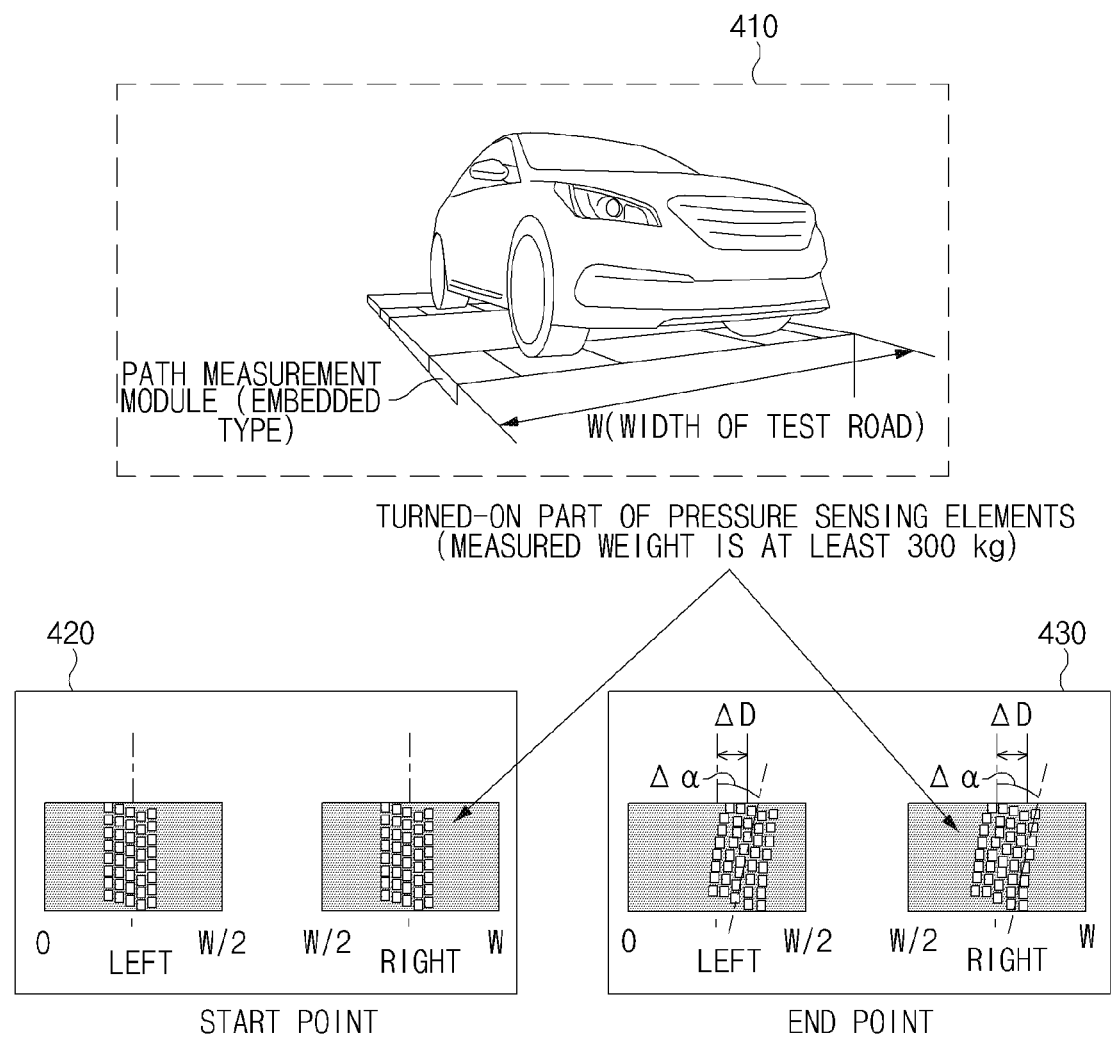
FIG. 4 is a view illustrating a method of measuring vehicle approach locations and directions using pressure sensing elements included in a path measurement module according to one form of the present disclosure.

FIG. 4 is a view illustrating a method of measuring vehicle approach locations and directions using pressure sensing elements included in a path measurement module according to one form of the present disclosure.

Referring to reference numeral 410 of FIG. 4, in a vehicle pull measurement section of a test road with a width of W, path measurement modules may be buried under the road.

The path measurement modules may be disposed at the start point and the end point of the vehicle pull measurement section and may measure the locations and angles of left/right tires of a vehicle passing the start point and the end point, by sensing pressures applied by the tires of the vehicle.

For example, a plurality of pressure sensing elements included in each of the path measurement modules may output pressure sensing signals by being activated when the measured weight is at least 300 Kg.

The path measurement modules may identify the pressure sensing elements that output the pressure sensing signals and may calculate variations in approach locations (or displacements $\Delta D$) of the tires of the vehicle and variations in approach directions thereof (or variations $\Delta \alpha$ in approach angles).

Referring to reference numerals 420 and 430, the approach locations of the left/right tires that are measured at the end point of the vehicle pull measurement section are spaced a distance of ΔD from the approach locations of the left/right tires that are measured at the start point of the vehicle pull measurement section.

Furthermore, the approach directions of the left/right tires that are measured at the end point of the vehicle pull measurement section are inclined at an angle of Δα with respect to the approach directions of the left/right tires that are measured at the start point of the vehicle pull measurement section.

In one form, center lines may be drawn on the test road as absolute coordinates for measurement of the approach locations and the approach directions. The vehicle pull inspection system may measure the displacements and the angle variations by comparing the center lines and travel lines.

As described above, the vehicle pull inspection system according to one form of the present disclosure may measure the degree of vehicle pull through the path measurement modules buried at the start point and the end point of the vehicle pull inspection section.

Figure 5:
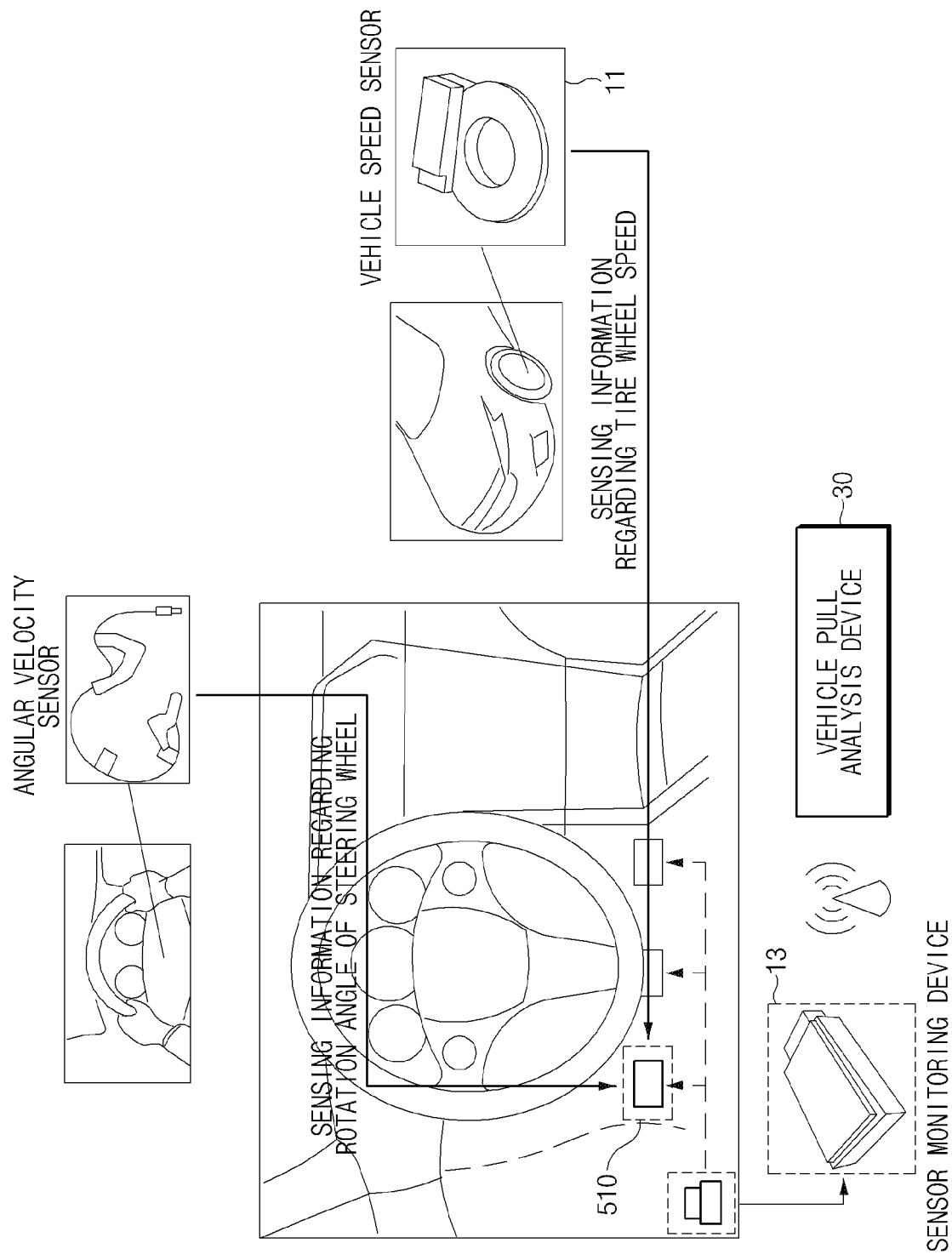
FIG. 5 is a view illustrating an operation of a sensor monitoring device according to one form of the present disclosure.

FIG. 5 is a view illustrating an operation of the sensor monitoring device according to another form of the present disclosure.

Referring to FIG. 5, the sensor monitoring device 13 may be connected to an OBD II connecting terminal 510 installed in the vehicle 10 and may receive sensing information from the angular velocity sensor 12 and the vehicle speed sensor 11.

The sensor monitoring device 13 may receive sensing information regarding the rotation angle of the steering wheel from the angular velocity sensor 12 and may receive sensing information regarding the speeds of the tire wheels from the vehicle speed sensor 11.

The sensor monitoring device 13 may start or end a sensor monitoring operation depending on a control signal of the vehicle pull analysis device 30.

For example, the vehicle pull analysis device 30 may receive, from the travel path measurement device 20, a first control signal indicating that the vehicle 10 that is subjected to the vehicle pull inspection passes the start point of the vehicle pull measurement section. The vehicle pull analysis device 30 may control the sensor monitoring device 13 to start the sensor monitoring operation depending on the first control signal.

For example, the vehicle pull analysis device 30 may receive, from the travel path measurement device 20, a second control signal indicating that the vehicle 10 that is subjected to the vehicle pull inspection passes the endpoint of the vehicle pull measurement section. The vehicle pull analysis device 30 may control the sensor monitoring device 13 to end the sensor monitoring operation depending on the second control signal.

The sensor monitoring device 13 may transmit the monitored sensing information to the vehicle pull analysis device 30 via wireless communication.

The vehicle pull analysis device 30 may determine whether the steering wheel is artificially operated by external force or a driver during travel of the vehicle in the vehicle pull measurement section, based on the sensing information regarding the rotation angle of the steering wheel that is received from the sensor monitoring device 13.

Furthermore, the vehicle pull analysis device 30 may determine whether the travel speed is maintained at the regulation speed defined for the vehicle pull inspection during the travel of the vehicle in the vehicle pull measurement section, based on the sensing information regarding the speeds of the tire wheels that is received from the sensor monitoring device 13.

As described above with reference to FIGS. 4 and 5, the vehicle pull inspection system according to the present disclosure may provide a more accurate vehicle pull inspection result, based on the physical measurement values measured by the path measurement modules of the travel path measurement device 20 and the sensing information collected by the sensor monitoring device 13.

Figure 6:
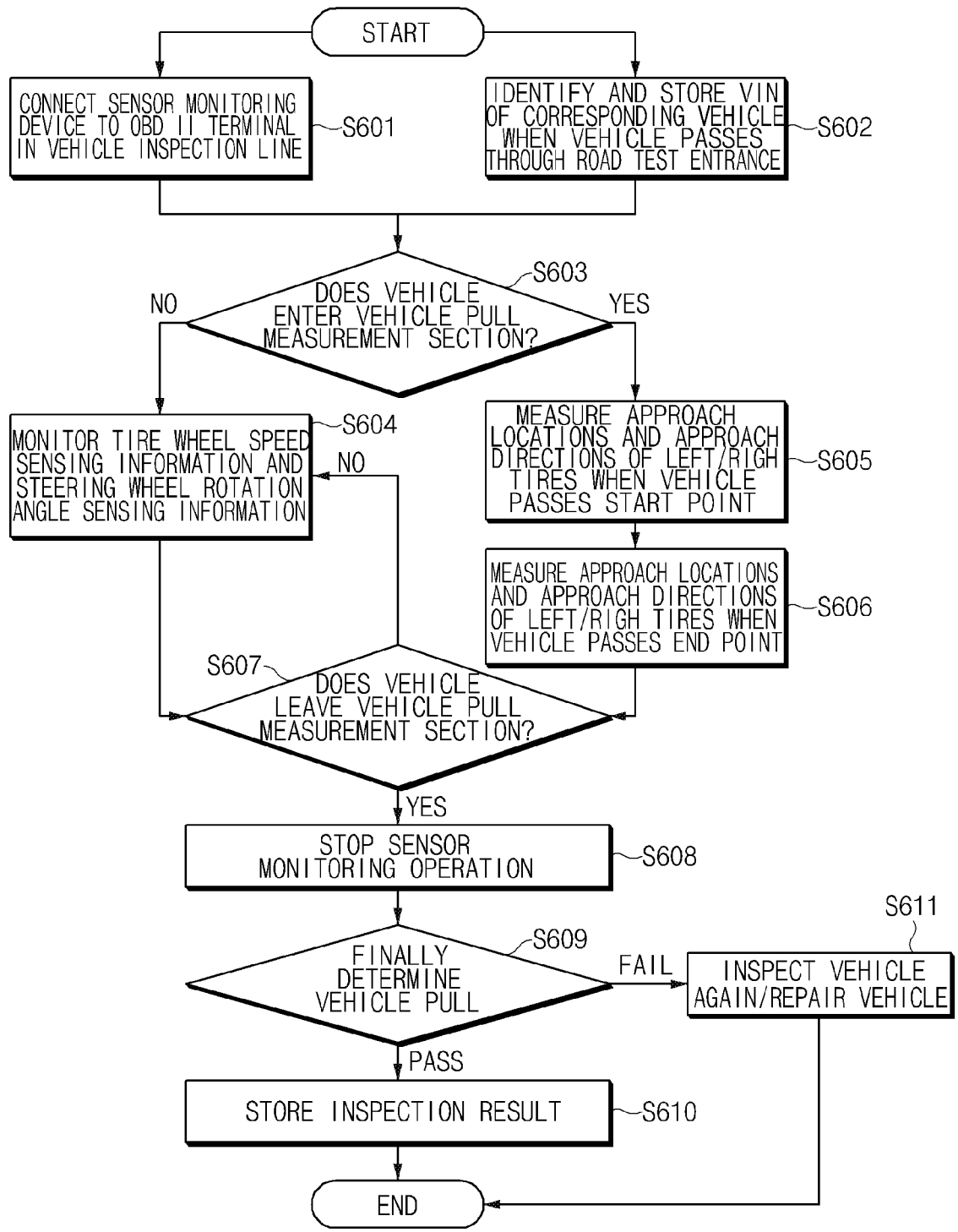
FIG. 6 is a flowchart illustrating a vehicle pull inspection method using the vehicle pull inspection system according to one form of the present disclosure.

FIG. 6 is a flowchart illustrating a vehicle pull inspection method using the vehicle pull inspection system according to another form of the present disclosure.

Referring to FIG. 6, in a vehicle inspection line, the sensor monitoring device 13 may be connected to the OBD II connecting terminal 510 installed in the vehicle 10 that is subjected to the vehicle pull inspection (S601).

When the vehicle 10 that is subjected to the vehicle pull inspection passes through a road test entrance, the vehicle pull inspection system 200 may identify and store the VIN of the corresponding vehicle (S602).

For example, the sensor monitoring device 13 may obtain the VIN of the vehicle 10 from a specific electric control unit (ECU) installed in the vehicle 10 and may transmit the VIN of the vehicle 10 to the vehicle pull analysis device 30.

The vehicle pull inspection system 200 may detect whether the vehicle 10 that is subjected to the vehicle pull inspection enters the vehicle pull measurement section (S603).

When it is detected that the vehicle 10 enters the vehicle pull measurement section, the vehicle pull inspection system 200 may activate a sensor monitoring operation and may monitor sensing information regarding the speeds of the tire wheels and sensing information regarding the rotation angle of the steering wheel (S604).

Furthermore, when it is detected that the vehicle 10 enters the vehicle pull measurement section, the vehicle pull inspection system 200 may activate a travel path measurement operation. The vehicle pull inspection system 200 may measure approach locations and approach directions of the left/right tires when the vehicle 10 passes the start point (S605), and may measure approach locations and approach directions of the left/right tires when the vehicle 10 passes the end point (S606).

When detecting that the vehicle 10 leaves the vehicle pull measurement section (S607), the vehicle pull inspection system 200 may stop the activated sensor monitoring operation (S608).

The vehicle pull inspection system 200 may finally determine whether the vehicle 10 pulls to one side, based on the sensing information monitored in S604 and the approach location information and the approach direction information measured in S605 and S606 (S609).

For example, the vehicle pull inspection system 200 may determine that the vehicle 10 passes the vehicle pull inspection, when the displacement between the start point and the end point satisfies a first reference range (e.g., ±1 m or less), the variation in the rotation angle of the steering wheel in the vehicle pull inspection section satisfies a second reference range (e.g., ±0.5 degrees or less), and the variation in the travel speed in the vehicle pull measurement section satisfies a third reference range (e.g., 80±5 KPH). When the aforementioned conditions are not satisfied, the vehicle pull inspection system 200 may determine that the vehicle 10 fails to pass the vehicle pull inspection.

When it is determined that the vehicle 10 passes the vehicle pull inspection, the vehicle pull inspection system 200 may store the inspection result (S610).

When it is determined that the vehicle 10 fails to pass the vehicle pull inspection, the vehicle pull inspection system 200 may perform control to allow the vehicle 10 to be inspected again or repaired (S611).

Figure 7:
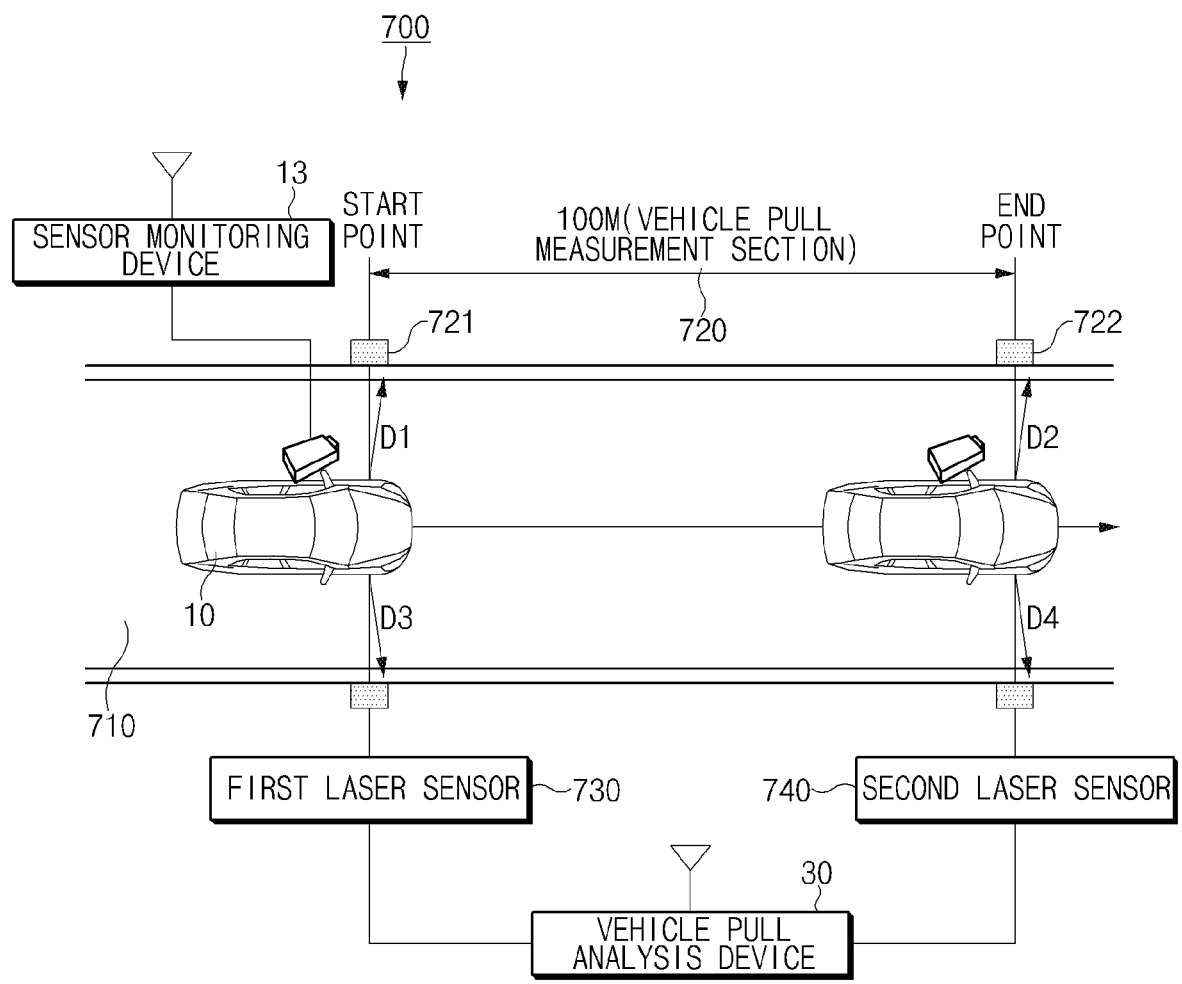
FIG. 7 is a view illustrating a vehicle pull determination procedure in a vehicle pull inspection system according to another form of the present disclosure.

FIG. 7 is a view illustrating a vehicle pull determination procedure in a vehicle pull inspection system according to another form of the present disclosure.

Referring to FIG. 7, a partial straight road section of a test road 710 may be used as a vehicle pull measurement section 720.

At a start point 721 of the vehicle pull measurement section 720, a first laser sensor 730 may be installed beside the test road 710.

At an end point 722 of the vehicle pull measurement section 720, a second laser sensor 740 may be installed beside the test road 710.

The first laser sensor 730 may measure the separation distances D1 and D3 between the first laser sensor 730 and the vehicle 10 by using a laser signal reflected from the vehicle 10.

The second laser sensor 740 may measure the separation distances D2 and D4 between the second laser sensor 740 and the vehicle 10 by using a laser signal reflected from the vehicle 10.

The vehicle pull analysis device 30 may calculate the travel location change (that is, the displacement) of the vehicle 10 in the vehicle pull measurement section 720, based on the separation distances D1 and D3 measured by the first laser sensor 730 and the separation distances D2 and D4 measured by the second laser sensor 740.

The vehicle pull analysis device 30 may determine whether the vehicle 10 pulls to one side, based on the calculated displacement.

The sensor monitoring device 13 may collect information from various types of sensors installed in the vehicle 10 and may provide the collected information to the vehicle pull analysis device 30 via wireless communication.

Here, the sensors may include, but are not limited to, the vehicle speed sensor 11 that senses the current travel speed by measuring the rotational speeds of tire wheels of the vehicle 10 and the angular velocity sensor 12 that senses the rotation angle of the steering wheel of the vehicle 10.

The vehicle pull analysis device 30 may determine whether the vehicle 10 travels at the regulation speed in the vehicle pull measurement section 720, based on the current travel speed information (or the tire wheel speed sensing information) that is received from the sensor monitoring device 13. For example, the regulation speed may be, but is not limited to, 80±5 KPH.

The vehicle pull analysis device 30 may determine whether the steering wheel is artificially operated by a driver of the vehicle 10 or external pressure, based on the information regarding the rotation angle of the steering wheel that is received from the sensor monitoring device 13.

When it is determined that the regulation speed is maintained in the vehicle pull measurement section 720 and the driver does not operate the steering wheel, the vehicle pull analysis device 30 may finally determine whether the vehicle 10 passes the vehicle pull inspection, based on the calculated displacement.

In the related art, a vehicle pull inspection method using a line laser sensor is disclosed. However, the present disclosure may provide a more accurate vehicle pull inspection method by additionally using the sensor monitoring device.

The operations of the method or the algorithm described in connection with the forms disclosed herein may be embodied directly in hardware or a software module executed by a processor, or in a combination thereof. The software module may reside on a storage medium (that is, a memory and/or storage) such as a RAM, a flash memory, a ROM, an EPROM, an EEPROM, a register, a hard disk, a removable disk, or a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The present disclosure has an advantage of providing the system and method for inspecting vehicle pull.

The vehicle pull inspection system and method may more accurately inspect a vehicle pull phenomenon of a target vehicle using the travel path measurement device buried under the test road for vehicle pull inspection and the sensor monitoring device installed in the vehicle.

The vehicle pull inspection system and method may more accurately inspect a vehicle pull phenomenon of a target vehicle using the laser sensor installed on one side of the test road and the sensor monitoring device installed in the vehicle.

The vehicle pull inspection system and method may perform a vehicle pull inspection based on objective and quantitative data, instead of an emotional evaluation dependent on a tester's subjective determination, experience, and driving habit.

The vehicle pull inspection system and method may achieve excellent data consistency, may reduce or minimize driver intervention and additional steps, and may facilitate maintenance and management.

The vehicle pull inspection system and method may reduce or minimize user complaints about a vehicle pull phenomenon, thereby not only improving product satisfaction but also reducing post-management costs.

In addition, the present disclosure may provide various effects that are directly or indirectly recognized.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the foams. The scope of the present disclosure should be construed on the basis of the accompanying claims, and all the technical ideas within the scope equivalent to the claims should be included in the scope of the present disclosure.

What is claimed is:

1. A system for inspecting vehicle pull, the system comprising:
   a sensor monitoring device configured to collect information for vehicle pull inspection from a sensor installed in a vehicle;

a travel path measurement device configured to measure a travel path of the vehicle in a vehicle pull measurement section; and a vehicle pull analysis device configured to determine whether the vehicle passes the vehicle pull inspection, based on the collected information from the sensor monitoring device and travel path measurement information collected from the travel path measurement device, wherein the travel path measurement information includes information regarding approach location variations and approach direction variations of left and right tires of the vehicle.

2. The system of claim 1, wherein the sensor includes:
a vehicle speed sensor configured to generate tire wheel speed information to measure a travel speed of the vehicle; and
an angular velocity sensor configured to generate rotation angle sensing information of a steering wheel to determine whether the steering wheel is artificially operated.

3. The system of claim 2, wherein the travel path measurement device includes:
a first path measurement module buried under a road at a start point of the vehicle pull measurement section; and
a second path measurement module buried under the road at an end point of the vehicle pull measurement section.

4. The system of claim 3, wherein each of the first and second path measurement modules includes a plurality of pressure sensing elements, and pressure sensing elements of the plurality of pressure sensing elements are configured to output pressure sensing signals when pressures applied by the left and right tires of the vehicle are higher than or equal to a reference value.

5. The system of claim 4, wherein the travel path measurement device is configured to generate the travel path measurement information in the vehicle pull measurement section, based on the pressure sensing signals from the pressure sensing elements of the first and second path measurement modules.

6. The system of claim 1, wherein the vehicle pull analysis device is configured to determine that the vehicle passes the vehicle pull inspection, when the approach location variations satisfy a first reference range and the approach direction variations satisfy a second reference range in a case where the travel speed of the vehicle in the vehicle pull measurement section is maintained at a pre-defined regulation speed and a steering wheel is not artificially operated.

7. The system of claim 1, wherein the sensor monitoring device is connected to an on-board diagnostics terminal installed in the vehicle.

8. The system of claim 1, wherein the sensor monitoring device includes a wireless communication module and is configured to transmit the collected information for the vehicle pull inspection to the vehicle pull analysis device via wireless communication.

9. The system of claim 8, wherein the wireless communication includes at least one of Wi-Fi communication, 4G long term evolution (LTE) communication, or 5G new radio (NR) communication.

10. A method for inspecting vehicle pull in a vehicle pull inspection system, the method comprising:
detecting, by a vehicle pull inspection system, whether a target vehicle enters a vehicle pull measurement section;

collecting, by a sensor monitoring device, sensing information from a sensor installed in the target vehicle, when it is detected that the vehicle enters the vehicle pull measurement section;

measuring, by a travel path measurement device, travel paths of left and right tires of the target vehicle at a start point and an end point of the vehicle pull measurement section, when the vehicle enters the vehicle pull measurement section; and determining, by a vehicle pull analysis device, whether the target vehicle passes a vehicle pull inspection, based on the collected sensing information and the measured travel paths, when the vehicle leaves the vehicle pull measurement section, wherein the measured travel paths include information regarding approach location variations and approach direction variations of the left and right tires of the target vehicle.

11. The method of claim 10, wherein the sensor includes:
a vehicle speed sensor configured to generate tire wheel speed information to measure a travel speed of the target vehicle; and
an angular velocity sensor configured to generate rotation angle information of a steering wheel of the target vehicle to determine whether the steering wheel of the target vehicle is artificially operated.

12. The method of claim 11, wherein the travel path measurement device includes a first path measurement module and a second path measurement module that are buried under a road at the start point and the end point of the vehicle pull measurement section.

13. The method of claim 12, wherein each of the first and second path measurement modules includes a plurality of pressure sensing elements, and pressure sensing elements of the plurality of pressure sensing elements are configured to output pressure sensing signals when pressures applied by the left and right tires of the target vehicle are higher than or equal to a reference value.

14. The method of claim 13, wherein the travel paths of the left and right tires in the vehicle pull measurement section are measured based on the pressure sensing signals from the pressure sensing elements.

15. The method of claim 10, wherein in determining whether the target vehicle passes the vehicle pull inspection, the vehicle pull analysis device determines that the target vehicle passes the vehicle pull inspection, when the approach location variations satisfy a first reference range and the approach direction variations satisfy a second reference range in a case where the travel speed of the target vehicle in the vehicle pull measurement section is maintained at a pre-defined regulation speed and a steering wheel is not artificially operated.

16. The method of claim 15, wherein the sensor monitoring device is connected to an on-board diagnostics terminal installed in the target vehicle and configured to collect the sensing information.

17. The method of claim 16, wherein the sensor monitoring device includes a wireless communication module and is configured to transmit the collected sensing information to the vehicle pull analysis device via wireless communication.

18. The method of claim 17, wherein the wireless communication includes at least one of Wi-Fi communication, 4G long term evolution (LTE) communication, or 5G new radio (NR) communication.

* * * * *